(12) United States Patent
Singh

(10) Patent No.: US 9,340,211 B1
(45) Date of Patent: May 17, 2016

(54) INTELLIGENT TIRE-BASED ROAD FRICTION ESTIMATION SYSTEM AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/558,755

(22) Filed: Dec. 3, 2014

(51) Int. Cl.
| | |
|---|---|
| B60C 23/00 | (2006.01) |
| H04B 1/06 | (2006.01) |
| B60W 40/068 | (2012.01) |
| G01M 17/02 | (2006.01) |

(52) U.S. Cl.
CPC ......... B60W 40/068 (2013.01); *B60W 2400/00* (2013.01); *B60W 2520/20* (2013.01); *B60W 2520/26* (2013.01)

(58) Field of Classification Search
CPC ....... G01M 17/02; B60C 21/00; B60C 23/06; H04B 7/0465; H04B 1/06; B60W 40/10
USPC ......... 701/32.9, 72, 73, 80, 41; 73/146, 146.5
See application file for complete search history.

(56) References Cited

U.S. PATENT DOCUMENTS

| | | | |
|---|---|---|---|
| 5,260,683 A | 11/1993 | Tanaka et al. | |
| 5,553,491 A | 9/1996 | Naito et al. | |
| 5,826,207 A | 10/1998 | Ohashi et al. | |
| 6,539,295 B1 | 3/2003 | Katzen et al. | |
| 6,637,276 B2 | 10/2003 | Adderton et al. | |
| 6,697,726 B2 | 2/2004 | Takagi et al. | |
| 6,962,075 B2 | 11/2005 | Bertrand | |
| 7,130,735 B2 | 10/2006 | Brown et al. | |
| 7,240,542 B2 | 7/2007 | Gustafsson et al. | |
| 7,404,317 B2 | 7/2008 | Mancosu et al. | |
| 7,404,319 B2 | 7/2008 | Poulbot et al. | |
| 7,415,874 B2 | 8/2008 | Mancosu et al. | |
| 7,546,764 B2 | 6/2009 | Morinaga | |
| 7,549,327 B2 | 6/2009 | Breed | |
| 7,552,628 B2 | 6/2009 | Mancosu | |
| 7,681,960 B2 | 3/2010 | Wanke et al. | |
| 7,856,871 B2 | 12/2010 | Mancosu et al. | |
| 8,155,798 B2 | 4/2012 | Seiniger et al. | |
| 8,844,346 B1 | 9/2014 | Singh et al. | |
| 8,886,395 B2 | 11/2014 | Singh et al. | |
| 2002/0059023 A1 | 5/2002 | Takagi et al. | |
| 2002/0162389 A1 | 11/2002 | Yokota et al. | |
| 2003/0058118 A1 | 3/2003 | Wilson | |
| 2003/0121319 A1 | 7/2003 | Kojima et al. | |

(Continued)

FOREIGN PATENT DOCUMENTS

| | | |
|---|---|---|
| DE | 19716586 C1 | 8/1998 |
| DE | 102008046269 | 12/2009 |

(Continued)

*Primary Examiner* — Tan Q Nguyen
(74) *Attorney, Agent, or Firm* — Edward T. Kennedy

(57) ABSTRACT

A road friction estimation system and method includes tire-affixed sensors and on-board vehicle sensors, a model-based tire force estimator operable generating from sensor-input a model-derived tire force estimation, a vehicle observer generating an observer-derived tire force estimation and a friction estimator generating a road friction estimation from a comparison of the model-derived tire force estimation and the observer-derived tire force estimation.

14 Claims, 16 Drawing Sheets

(56) References Cited

U.S. PATENT DOCUMENTS

| | | |
|---|---|---|
| 2003/0236603 A1 | 12/2003 | Lu |
| 2004/0199314 A1 | 10/2004 | Meyers et al. |
| 2004/0254707 A1 | 12/2004 | Lu et al. |
| 2005/0033486 A1 | 2/2005 | Schmitt et al. |
| 2005/0072223 A1 | 4/2005 | Fennel et al. |
| 2005/0085987 A1* | 4/2005 | Yokota ............... B60C 23/0477 701/80 |
| 2005/0150283 A1 | 7/2005 | Shick |
| 2005/0177296 A1 | 8/2005 | Brown et al. |
| 2007/0010928 A1 | 1/2007 | Brusarosco et al. |
| 2007/0017727 A1 | 1/2007 | Messih et al. |
| 2007/0255510 A1* | 11/2007 | Mancosu ............... B60T 8/172 702/34 |
| 2008/0103659 A1 | 5/2008 | Mancosu |
| 2009/0055040 A1 | 2/2009 | Nagaya |
| 2010/0063671 A1 | 3/2010 | Fink et al. |
| 2010/0211256 A1* | 8/2010 | Takenaka ............... B60T 8/172 701/31.4 |
| 2011/0060500 A1 | 3/2011 | Irth et al. |
| 2011/0199201 A1 | 8/2011 | Brusarosco et al. |
| 2013/0151075 A1 | 6/2013 | Moshchuk et al. |
| 2013/0211621 A1 | 8/2013 | Breuer et al. |

FOREIGN PATENT DOCUMENTS

| | | |
|---|---|---|
| EP | 2301769 A1 | 3/2011 |
| EP | 2172760 A4 | 8/2012 |
| WO | WO2011054363 A1 | 5/2011 |

* cited by examiner

INTELLIGENT TIRE-BASED ROAD FRICTION ESTIMATION SYSTEM AND METHOD

FIELD OF THE INVENTION

The invention relates generally to tire monitoring systems for collecting measured tire parameter data during vehicle operation and, more particularly, to systems utilizing such tire sensor-based data in vehicle control systems.

BACKGROUND OF THE INVENTION

It is desirable to ascertain and use road friction levels for adjusting vehicle control systems such as braking, anti-lock brake, steering and collision avoidance. Estimation of road friction, however, has proven problematic when road conditions are subject to constant change during vehicle operation. Accordingly, there remains a need for a road friction estimation system that is robust and accurate and which can adapt to changes to road conditions during operation of a vehicle.

SUMMARY OF THE INVENTION

In one aspect of the invention, a road friction estimation system and method includes tire-affixed sensors and on-board vehicle sensors, a model-based tire force estimator operable generating from sensor-input a model-derived tire force estimation, a vehicle observer generating an observer-derived tire force estimation and a friction estimator generating a road friction estimation from a comparison of the model-derived tire force estimation and the observer-derived tire force estimation.

In another aspect, the vehicle observer receives inputs based upon sensor-measured tire-specific information including a load estimation for the vehicle tire, a slip angle estimation for the vehicle tire and a cornering stiffness estimation for the tire. The cornering stiffness estimation for the tire receives as inputs from the tire-affixed sensors tire temperature change, tire pressure change, wear state of the tire tread and loading on the tire.

According to another aspect, the model-based tire force estimator employs and utilizes a slip-dependent friction function.

Pursuant to another aspect, the cornering stiffness adaptation input providing the loading on the tire is derived from a dynamic load estimator having as inputs the vehicle-specific information and the tire-specific information including sensor-measured changes in tire temperature and pressure.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Dugoff Model" is an empirical tire model providing analytical relations for the longitudinal and lateral forces as functions of the slip angle and slip ratio. It accounts for the coupling between the side and longitudinal forces.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
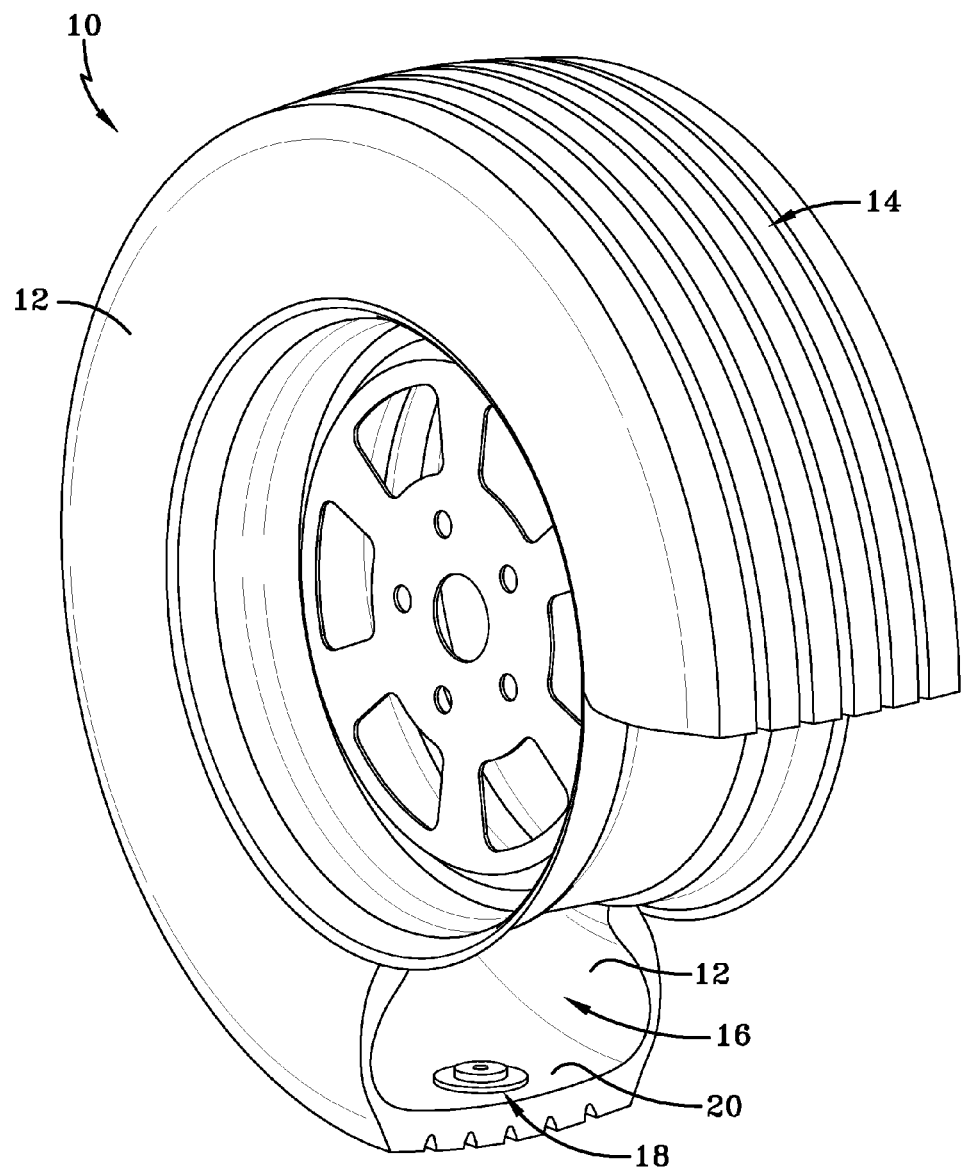
FIG. 1 is a partial sectional perspective view of a vehicle tire having a tire attached sensor device affixed thereto.

Referring to FIG. 1, a vehicle tire 10 is shown forming an integral component of the subject friction estimation system. The tire 10 is conventionally manufactured to support a vehicle (not shown). The tire 10 has a pair of sidewalls 12, a tire tread region 14, and a tire internal air cavity 16. A sensor assembly 18 attaches to the tire inner liner 20 within the cavity 16. The assembly 10, referred to as a tire pressure monitoring system (TPMS) in addition to a pressure sensor, includes sensors capable of measuring the temperature within cavity 16 and a tire ID transponder capable of identifying the tire by type and construction.

Figure 2:
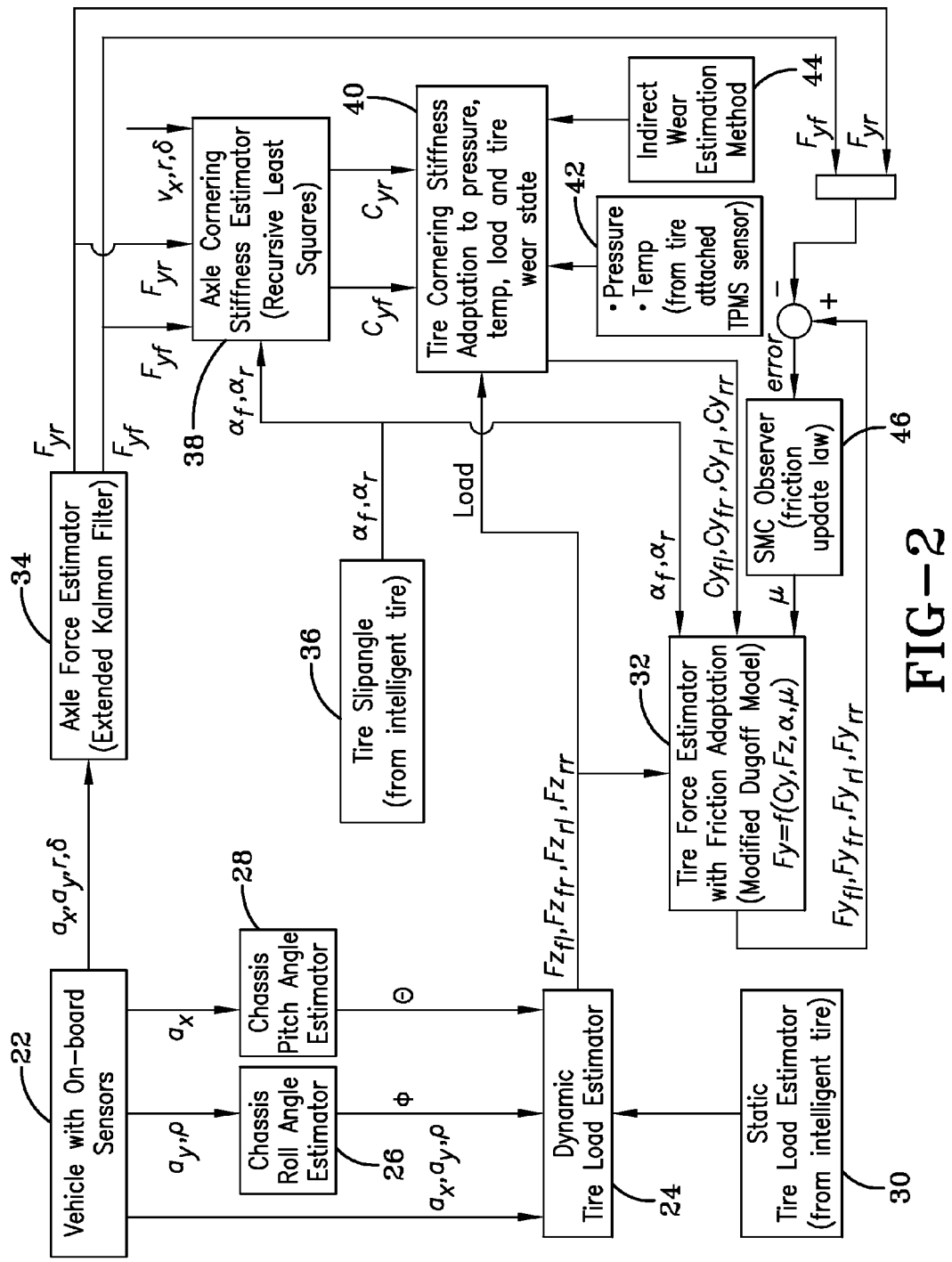
FIG. 2 is a data flow diagram of the friction estimation system.

FIG. 2 shows a data flow diagram of the subject friction estimation system. Below is a definitional key for the variables used and estimations made by the subject system.

| | |
|---|---|
| $Fy_f$: | front axle lateral force (in vehicle body axis) |
| $Fy_r$: | rear axle lateral force (in vehicle body axis) |
| $\Sigma Fx$: | summation of tire longitudinal forces (in a vehicle body axis) |
| $\phi$: | roll angle |
| $\theta$ | pitch angle |
| $\psi$: | yaw angle |
| $v_x$: | longitudinal velocity at C.G. |
| $v_y$: | lateral velocity at C.G. |
| $a_x$: | longitudinal acceleration measured at C.G. |
| $a_y$: | lateral acceleration measured at C. G. |
| $a_z$: | vertical acceleration measure at C.G. |
| p: | roll rate measured at C.G. |
| q: | pitch rate measured at C.G. |
| r: | yaw rate measured at C.G. |
| m: | total vehicle mass |
| $m_s$: | sprung mass of the vehicle |
| $m_u$: | unsprung mass of the vehicle |
| g: | gravitational constant |
| $h_{cg}$: | vehicle C.G. height |
| $h_r$: | height of the roll center from the ground |
| $h_{r\,front}$: | height of the front roll center from the ground |
| $h_{r\,rear}$: | height of the rear roll center from the ground |
| $h_a$: | height of the unsprung mass from the ground |
| $h_{roll}$: | height of the sprung mass from the roll axis |
| a: | distance between C.G. and front axle |
| b: | distance between C.G. and rear axle |
| l: | distance between front and rear axle |
| $I_z$: | moment of inertia about z - axis/yaw axis |
| $I_x$: | moment of inertia about x - axis/yaw axis |
| $\beta$ | vehicle side slip angle |
| $\delta_{sus}$: | suspension deflection |
| $\lambda$: | tire slip ratio |
| $\alpha$: | tire slip angle |
| $T_e$: | engine torque |
| $T_b$: | brake torque |
| $T_w$: | wheel torque |
| $\omega_w$: | wheel angular speed |
| $\theta_w$: | angular position of the wheel |
| $k_{roll}$: | roll stiffness |
| $c_{roll}$: | roll damping coefficient |
| $\phi_{chassis}$: | vehicle chassis roll angle |
| $\theta_{chassis}$: | vehicle chassis pitch angle |
| $\phi_{road\,bank}$: | road bank angle |
| $\theta_{road\,grade}$: | road grade angle |
| t: | track width |
| $\phi_{vehicle\,roll}$: | vehicle roll angle |
| $\phi_{vehicle\,roll\,SS}$: | vehicle steady state roll angle |
| $\phi_{vehicle\,roll\,TS}$: | vehicle transient state roll angle |
| $\theta_{vehicle\,pitch}$: | vehicle pitch angle |
| $\theta_{vehicle\,pitch\,SS}$: | vehicle steady state pitch angle |
| $\phi_{vehicle\,pitch\,SS}$: | vehicle transient state pitch angle |
| $a_{x,m}$: | measured longitudinal acceleration of the vehicle |
| $a_{y,m}$: | measured lateral acceleration of the vehicle |
| $a_{x,c}$: | bias - compensated longitudinal acceleration of the vehicle |
| $a_{y,c}$: | bias - compensated lateral acceleration of the vehicle |
| $r_o$: | original wheel radius |
| $r_w$: | effective wheel radius |
| $v_w$: | linear velocity of the four wheels |
| $v_{average}$: | average of the four wheel speeds |
| $v_{non-driven\,average}$: | average of the two non-driven wheel speeds |
| $v_{min}$: | vehicle speed threshold |
| $a_{acc}$: | acceleration threshold |
| $a_{dec}$: | deceleration threshold |
| $Fz_{front\,axle}$: | normal force of the front axle |
| $Fz_{rear\,axle}$: | normal force of the rear axle |
| $Fx_{fl}$: | longitudinal force of the front - left wheel |
| $Fx_{fr}$: | longitudinal force of the front - right wheel |
| $Fx_{rl}$: | longitudinal force of the rear - left wheel |
| $Fx_{rr}$: | longitudinal force of the rear - right wheel |
| $Fy_{fl}$: | lateral force of the front - left wheel |
| $Fy_{fr}$: | lateral force of the front - right wheel |
| $Fy_{rl}$: | lateral force of the rear - left wheel |
| $Fy_{rr}$: | lateral force of the rear - right wheel |
| $Fz_{fl}$: | vertical force of the front - left wheel |
| $Fz_{fr}$: | vertical force of the front - right wheel |
| $Fz_{rl}$: | vertical force of the rear - left wheel |
| $Fz_{rr}$: | vertical force of the rear - right wheel |
| $F_{rr}$: | rolling resistance force |
| $W_{lateral\,load\,transfer}$: | vehicle lateral load transfer |
| $W_{longitudinal\,load\,transfer}$: | vehicle longitudinal load transfer |
| LTR: | load transfer ratio $\delta$ |

-continued

| | |
|---|---|
| $k_f$: | front suspension stiffness |
| $k_r$: | rear suspension stiffness |
| $k_{bf}$: | brake gain of the front wheel |
| $k_{br}$: | brake gain of the rear wheel |
| $J_w$: | spin inertia for each wheel |
| $k_t$: | spring rate of the tire |
| $\delta$: | tire steer angle |
| $C_x$: | tire longitudinal stiffness |
| $C_y$: | tire cornering stiffness |
| $\mu$: | tire road friction coefficient |
| $C_d$: | vehicle drag coefficient |
| $A_f$: | frontal area of the vehicle |
| $\rho$: | density of air |
| A: | state matrix |
| B: | input matrix |
| C: | output matrix |
| D: | feed through matrix |
| P: | covariance matrix |

A vehicle 22 with on-board sensors generate tire slip angle and roll rate by means of conventionally deployed vehicle sensor systems. A chassis roll angle estimator 26 generates a roll angle estimate from the measured lateral acceleration and the measured roll rate at the center of gravity. A chassis pitch angle estimator 28 generates a pitch angle estimate from the vehicle-sensor measured longitudinal acceleration. The roll angle estimate, pitch angle estimate, measured lateral and longitudinal acceleration and measured roll rate at the center of gravity input into the dynamic tire load estimator 24. A static tire load estimator 30 generates a static load estimate input into the dynamic tire load estimator 24. Dynamic tire load estimates for the four vehicle tires are input into a tire force estimator with friction adaptation 32.

The acceleration measurement, yaw rate measured at the center of gravity and tire steer angle from the on-board sensors are processed through an axle force estimator (extended Kalman filter) 34 to generate front and rear axle force estimations $F_{yr}$ and $F_{yf}$. A tire slip angle 36 is determined as variables of $\alpha_f$ and $\alpha_r$ for the front and rear tires. An axle cornering stiffness estimator 38 operating on recursive least squares receives as inputs $\alpha_f$, $\alpha_r$, $F_{yf}$, $F_{yr}$, $v_x$, r, $\delta$ and generates cornering stiffness estimates $C_{yf}$ and $C_{yr}$. A tire cornering stiffness adaptation model 40 receives as inputs the cornering stiffness estimates and the dynamic tire load estimates as well as pressure and temperature measurements 42 from the vehicle tire sensors and an indirect wear estimation 44. The model 40 outputs cornering stiffness determinations to the tire force estimator with friction adaptation 32 for each of the four vehicle tires, adapted for tire pressure, temperature, load and tire wear state.

A SMC (sliding mode control) observer based upon a friction update law, as explained below determines a friction coefficient estimation 48 that inputs into the tire force estimator 32 to be compared with an estimator friction estimation $\mu$. The estimator 32 determines tire force estimations $FY_{fl}$, $FY_{fr}$, $FY_{rl}$ and $FY_{rr}$ determined from inputs into a modified dugoff model. The tire force estimations are a function of the cornering stiffness estimation Cy, the dynamic tire load estimator estimations Fz, the slip angle estimations a and friction $\mu$. The tire force estimations 32 loop back to the observer 46. Error between the observer 46 and the friction used in the tire force estimator with friction adaptation 32 is reduced to yield a final estimation of road friction.

The state variables from the vehicle on-board sensors 22 are CAN bus available. The chassis roll angle estimator 26 and the chassis pitch angle estimator 28 are available through conventional means as taught in the dissertation: "Development of an Intelligent Tire Based Tire-Vehicle State Estimator for Application to Global Chassis Control"; Kanwar Bharat Singh, Master's Thesis, Department of Mechanical Engineering, Virginia Tech University, 2012, incorporated herein in its entirety by reference. The static tire load estimator 30 is taught in U.S. Pat. No. 8,844,346, issued Sep. 30, 2014, entitled TIRE LOAD ESTIMATION SYSTEM USING ROAD PROFILE ADAPTIVE FILTERING, incorporated herein in its entirety by reference.

The dynamic tire load estimator 24 is configured as presented in co-pending U.S. Patent Publication No. 2014/0278040, published Sep. 18, 2014, entitled VEHICLE DYNAMIC LOAD ESTIMATION SYSTEM AND METHOD, hereby incorporated herein in its entirety. The axle force estimator 34 is configured as taught in: Baffet, Guillaume, Ali Charara, and Daniel Lechner, "Estimation of Vehicle Sideslip, Tire Force and Wheel Cornering Stiffness", Control Engineering Practice 17.11 (2009), Pages 1255 through 1264 and Doumiati, Moustapha, et al. "Observers for Vehicle Tyre/Road Forces Estimation: Experimental Validation", Vehicle System Dynamics 48.11 (2010), Pages 1345 through 1378, incorporated herein in relevant part by reference. The axle cornering stiffness estimator (recursive least squares) 38 is as shown in Siena, C. et al. "Cornering Stiffness Estimation Based on Vehicle Lateral Dynamics", Vehicle System Dynamics 44 supl (2006), Pages 24 through 38, incorporated herein in relevant part by reference. The tire slip angle (from intelligent tire) 36 used is seen in U.S. Pat. No. 8,886,395, issued Nov. 11, 2014, entitled DYNAMIC TIRE SLIP ANGLE ESTIMATION SYSTEM AND METHOD incorporated herein in its entirety by reference. The tire cornering stiffness adaptation model 40, adapted for tire pressure and temperature 42, load and tire wear state 44 are taught in co-pending U.S. patent application Ser. No. 14/549,845, filed Nov. 21, 2014, entitled TIRE CORNERING STIFFNESS ESTIMATION SYSTEM AND METHOD incorporated herein in its entirety by reference.

Figure 3:
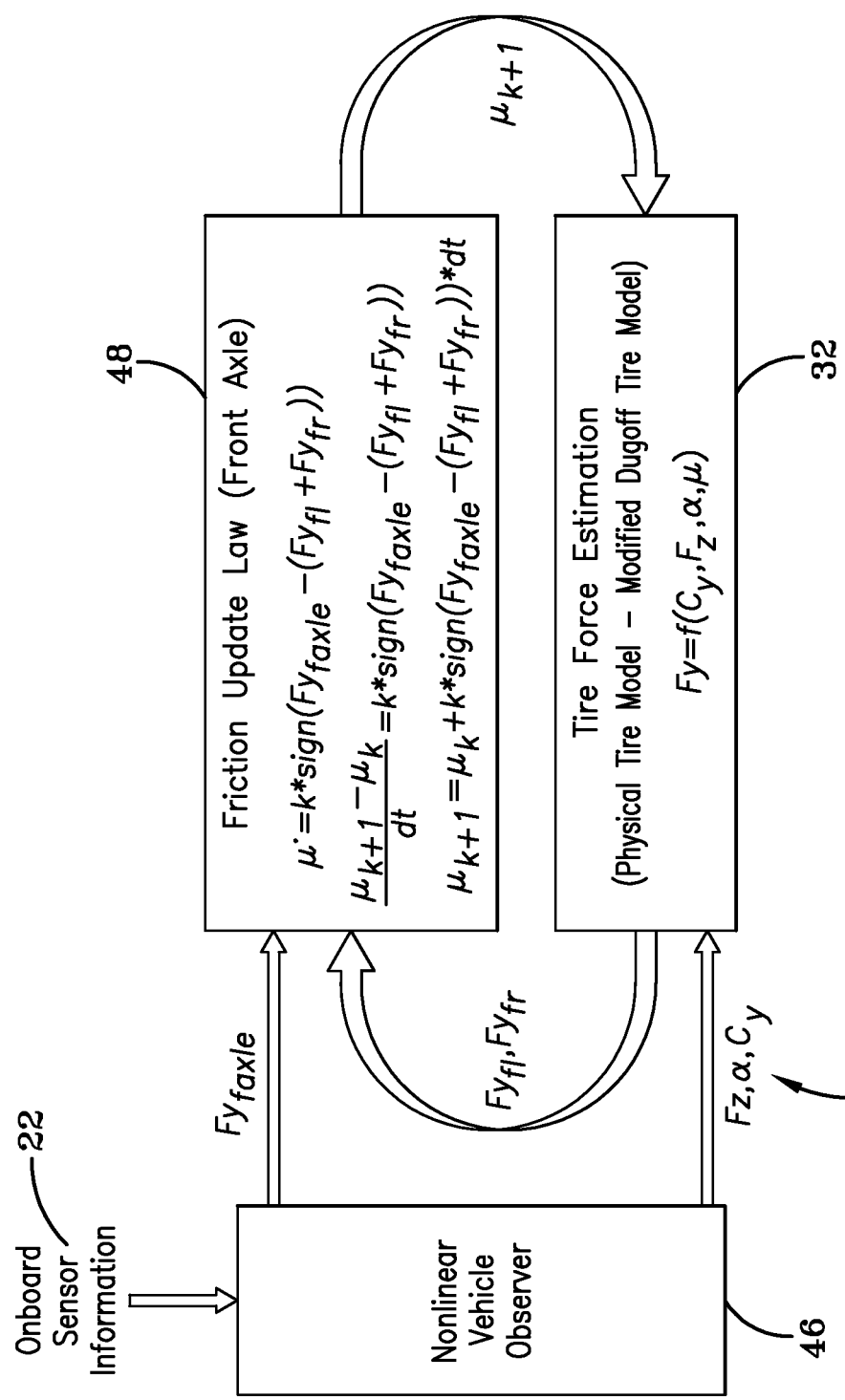
FIG. 3 is a diagram of the friction update law used in the friction estimation system.

The friction update law 48 used to realize tire-road friction estimation in the SMC observer 46 is seen in FIG. 3. Onboard (vehicle) sensor information 22 is provided to the nonlinear vehicle observer 46. The observer 46 estimates Fz, $\alpha$, and Cy are inputs 50 into the tire force estimation 32 utilizing a physical tire model, preferably a modified dugoff tire model. The tire force estimation outputs $Fy_{fl}$ and $Fy_{fr}$ are applied to the friction update law 48 together with the $Fy_{faxle}$ from the observer 46. The tire force estimation 32 is a physical tire model, preferably a modified dugoff tire model. The tire force estimation 32 is based on $F_y=f(C_y, F_z, \alpha, \mu)$. As seen in FIG. 3, the critical inputs consist of: $F_z$ (load) from intelligent tire sensors; $\alpha$ (slip angle) from intelligent tire sensors; $C_y$ (cornering stiffness) found using attached TPMS sensor; and indirect wear estimation technique for compensating the cornering stiffness term for inflation pressure, tempera The tread region 14 has a depth that decreases with tire wear through vehicle use. The subject friction estimation system requires an estimation be made of tread wear 44 (FIG. 2). Wear state may be determined by affixing wear sensors to the tire tread region or estimated indirectly by analytical modeling. Tread depth may be estimated indirectly pursuant to a tire wear state estimation algorithm, such as that taught and disclosed by co-pending U.S. application Ser. No. 13/917,691, filed Jun. 14, 2013, entitled TIRE WEAR STATE ESTIMATION SYSTEM AND METHOD, hereby incorporated by reference in its entirety herein. The indirect tire wear state estimation algorithm is used to generate tread depth estimation indirectly, that is, without the use of tire mounted tread depth measuring sensors. As such the difficulty of implementing and maintaining accurate tire-based sensor tread depth measurement is avoided. The indirect tire wear state estimation algorithm utilizes a hub acceleration signal which is accessible via the vehicle CAN bus from vehicle based sensors. The hub acceleration signal is analyzed and an estimation is made as to the tread depth which, in turn, is reflective of the tire effective radius from which tread depth may be estimated.

Figure 4:
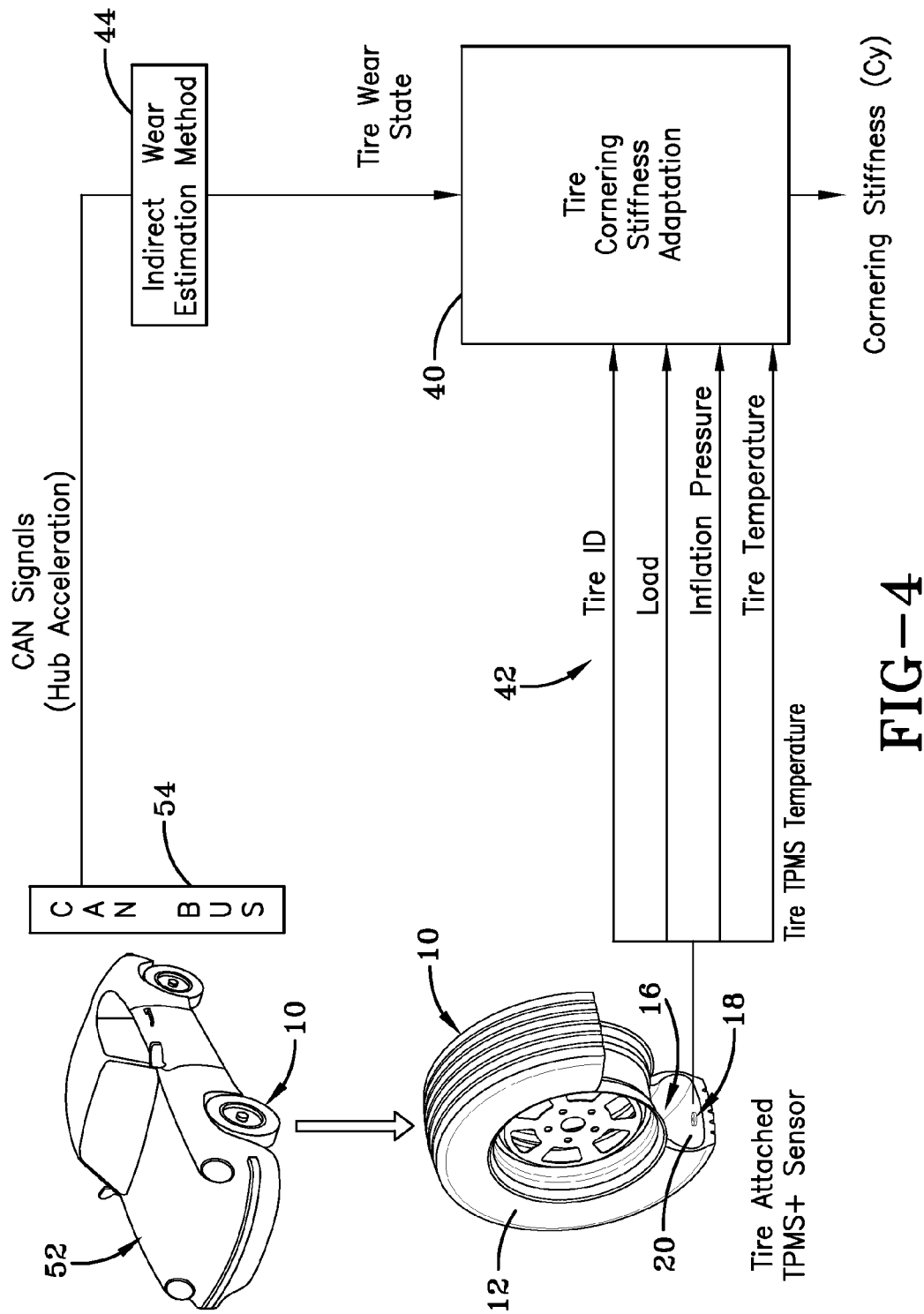
FIG. 4 is diagram of the tire cornering stiffness adaptation with tire sensed information used in the friction estimation system.

FIG. 4 shows in greater detail the tire cornering stiffness adaptation with tire sensed information. The vehicle 52 provides CAN signals 54 for hub acceleration as inputs into the indirect wear estimation method 44. The tire wear state from estimation 44 is input into the tire cornering stiffness adaption 40 with tire TPMS sensor provided inputs: tire ID, load, inflation pressure, tire temperature. From the tire cornering stiffness adaptation 40 the cornering stiffness ($C_y$) is determined.

Tire cornering stiffness characteristics fluctuate under varying operating conditions of the tire (temperature change, pressure change, tire wear state, load). Hence, adaptation is important for a good estimation of cornering stiffness. Sensitivity of cornering stiffness with load is on the order of a ten percent increase with a 200 pound increase in load. A 10 percent increase in cornering stiffness with a 4 psi decrease in tire pressure is likewise found. A 15 percent increase in stiffness with a 3 mm decrease in tread depth occurs, and a 30 percent drop in stiffness with a 25° C. increase in tire temperature is found. A modified dugoff tire model uses a slip dependent friction function and the general formulation is found below.

General Formulation $$F_x = C_x \frac{s}{1+s} f(\lambda)$$

$$F_y = C_y \frac{\tan(\alpha)}{1+s} f(\lambda)$$

where $\lambda$ is related to the tire/road friction coefficient, $\lambda$ and $f(\lambda)$ are defined as follows respectively:

$$\lambda = \frac{\mu F_z(1+s)}{2\sqrt{(C_x s)^2 + (C_y \tan\alpha)^2}}$$

$$f(\lambda) = \begin{cases} (2-\lambda)\lambda, & \lambda < 1 \\ 1, & \lambda \geq 1 \end{cases}$$

The subject modified dugoff model is found in Ding, Neggen and Taheri, Saied, "A Modified Dugoff Tire Model for Combined-slip Forces", *Tire Science and Technology*, TSTCA, Vol. 39, No. 3, July-September 2010, Pages 228 through 244, incorporated herein in relevant part by reference. The modified dugoff tire model performance is compared against a "magic formula" result. The "Magic Formula Tire Model", defined and explained below, is a tire model conventionally used within the tire industry to calculate steady-state force and moment characteristics. Its use herein is solely for the purpose of validating the subject invention's performance which utilizes the modified dugoff model identified and incorporated herein by reference above. The "Magic Formula Model" is accordingly a validation tool and does not comprise a part of the claimed invention.

Figure 5A:
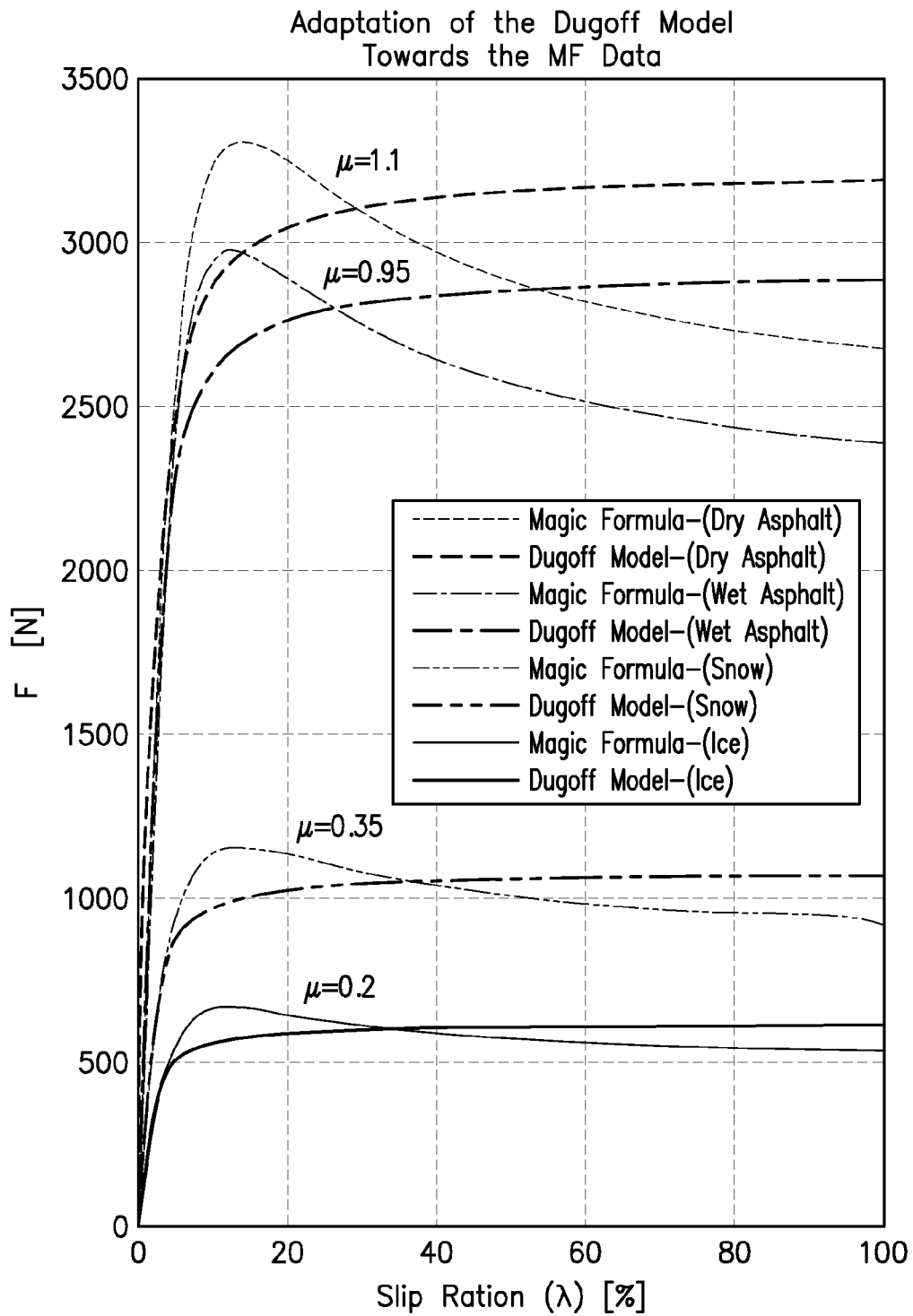
FIG. 5A is a graph of the performance of a dugoff tire model vs. "magic formula" results for friction prediction for different road conditions.

FIG. 5A shows adaptation of the dugoff model towards the "Magic Formula" data for dry asphalt, wet asphalt, snow and ice. "Magic Formula" is a term defined and explained as follows:

The Magic Formula Tire Model

The variation of the Magic Formula used herein is referred to as the "Pacejka Magic Formula". This is a widely used semi-empirical tire model that is used to calculate steady-state force and moment characteristics of the tire. This model is called the "magic formula" because there is no particular physical basis for the structure of the model equations, but they fit a wide variety of tire constructions and operating conditions. The first versions of the model at TU-Delft in collaboration with Volvo [1,2].

The main assumption behind this tire model is that the steady-state force characteristics of the tire under pure and combined slip conditions can be represented by a set of empirical mathematical equations. Initial versions of the magic formula tire model only concentrated on steady-state model fitting to experimental data. Over the years, multiple improvements were made to the tire model, including adding additional degrees to polynomial fits, relaxation behavior in the contact patch [3], scaling factors for different surfaces, inflation pressure dependencies [4] and variation of rolling resistance with load.

Model Formulation

The magic formula tire model is based on representing the steady-state force curve in lateral, longitudinal directions and aligning moments through empirical mathematical equations. The basic equation for the magic formula is given by:

$$y = D \sin [C \arctan \{Bx - E(Bx - \arctan Bx)\}]$$

Where $$Y(X) = y(x) + S_v$$

$$x = X + S_H$$

In this equation, the output quantity is represented by Y which can be either the lateral force, longitudinal force or aligning moment at a specific vertical load and camber for a given X which can be slip angle or slip ratio. The equation parameters are described as:

Model output, which can be either the lateral force, longitudinal force or aligning moment at a specific vertical load and camber X—Which can be slip angle $\alpha$ or slip ratio $_K$
$S_H$—Horizontal shift
$S_V$—Vertical shift
B, C, D, E, —Fit parameters The "Magic Model" is described in further detail by the following treatises:

REFERENCES

1. Bakker, Egbert, Lars Nyborg and Hans B. Pacejka; "Tyre Modeling for Use in Vehicle Dynamics Studies, No. 870421, *SAE Technical Paper*, 1987.
2. Bakker, Egbert, Hans B. Pacejka and Lars Lidner; "A New Tire Model with an Application in Vehicle Dynamics Studies", No. 890087, *SAE Technical Paper*, 1989.
3. Pacejka, H. B. and I. J. M. Besselink, "Magic Formula Tyre Model with Transient Properties", *Vehicle System Dynamics* 27, No. S1 (1997), Pages 234 through 249.

Figure 5B:
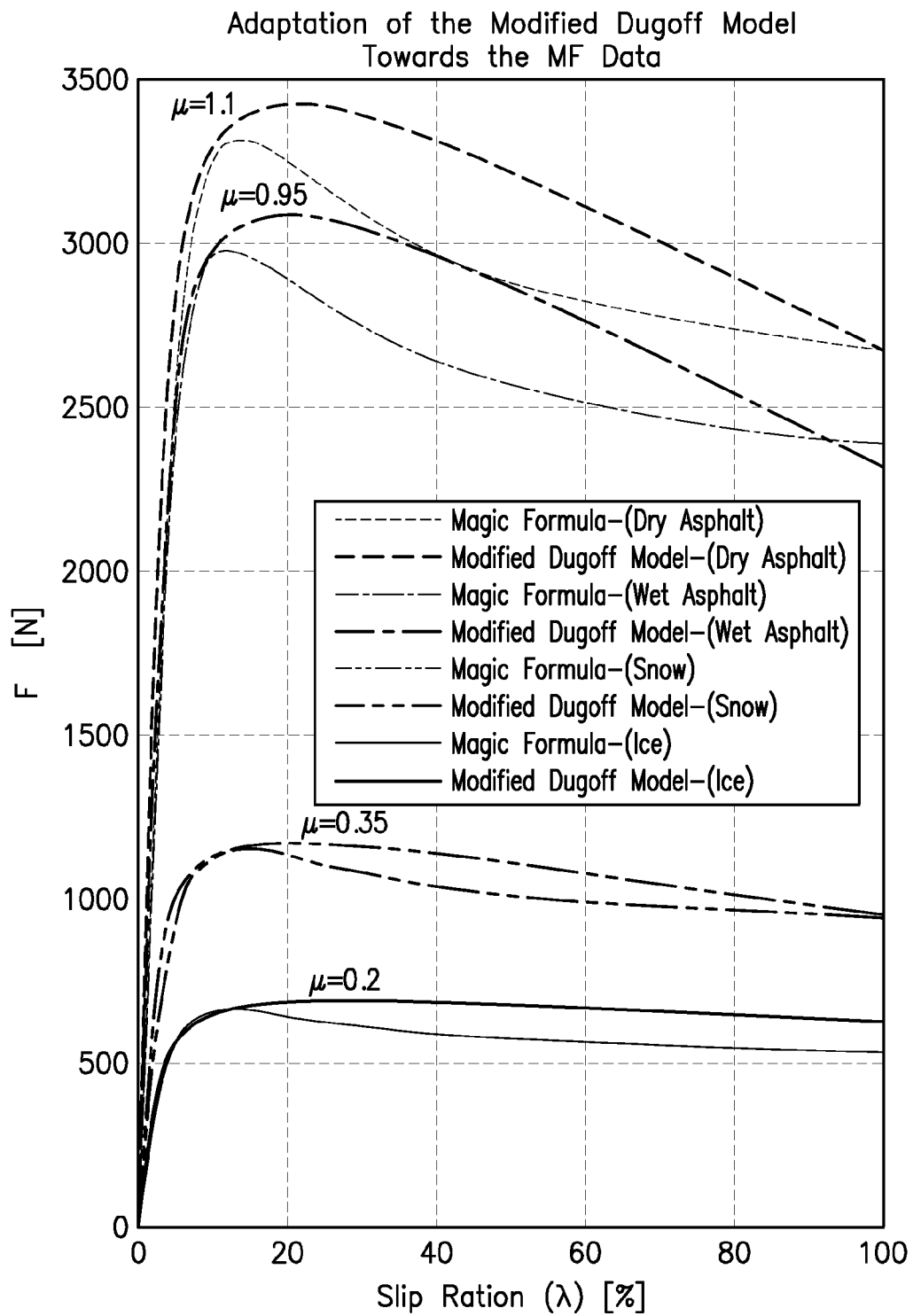
FIG. 5B is a graph of the performance of a modified dugoff tire model using a slip dependent friction function vs. magic formula for different road conditions.
Figure 6A:
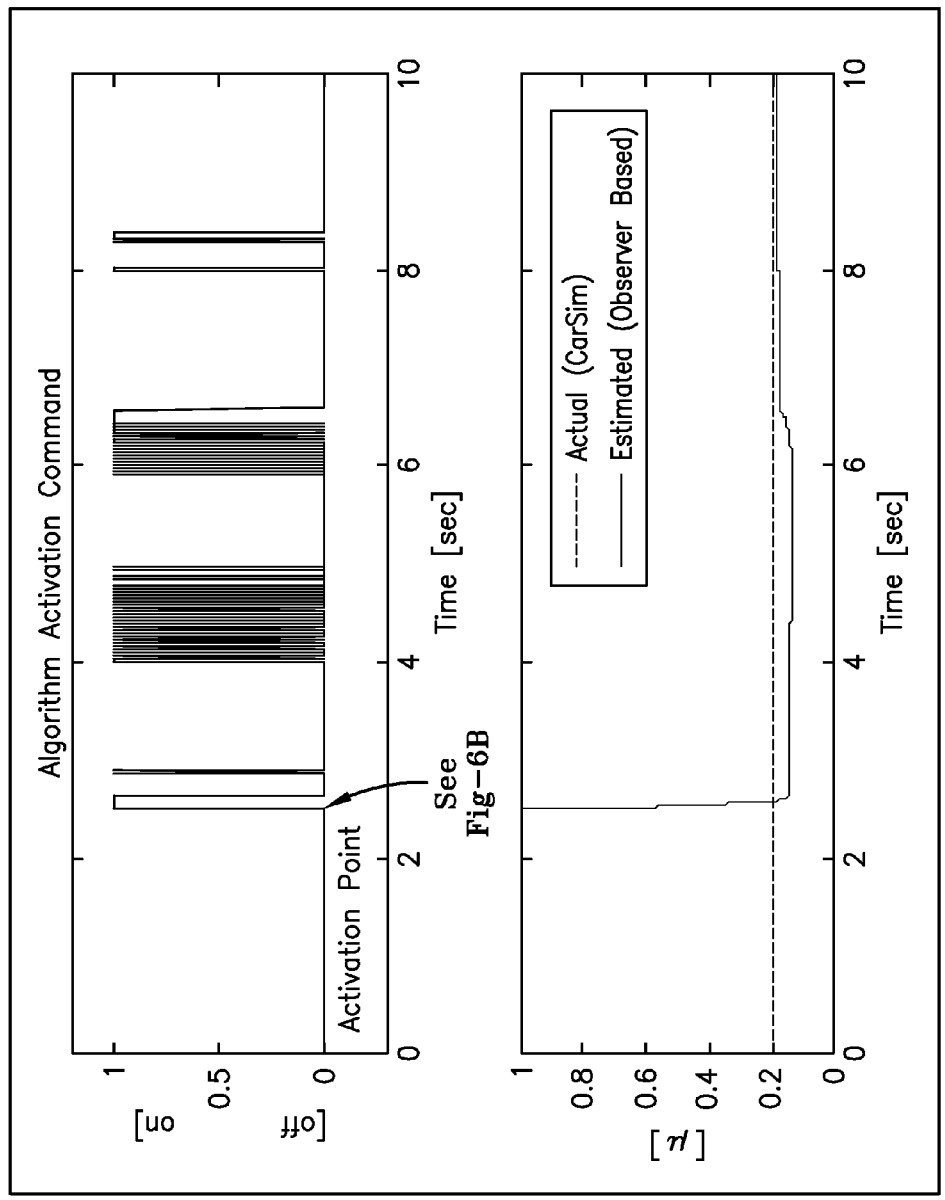
FIG. 6A is a graph of simulation results between actual (CarSim) and estimated friction using the observer estimation of the friction estimation system.
Figure 6B:
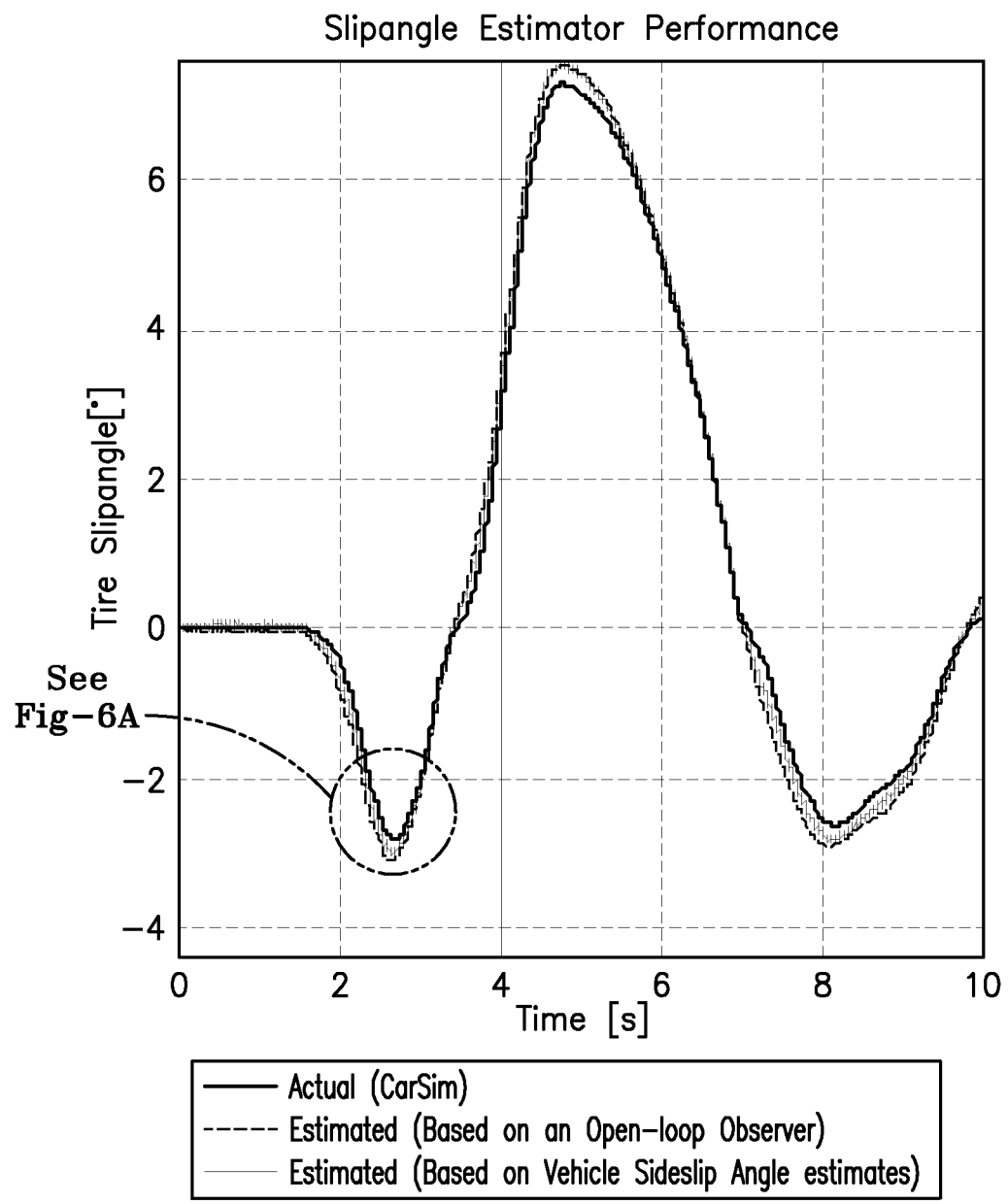
FIG. 6B is a graph showing slip angle estimator performance vs. actual.

The dugoff model is compared against the "Magic Formula" estimation in FIG. 5A. The comparative results are seen for different coefficients of friction μ representing different road conditions. The comparison of the dugoff model with adaption to the "Magic Formula" model is seen in FIG. 5B. For the test, the estimation algorithm was evaluated with a CarSim simulator. A sedan (Class D) was selected as the test vehicle, having 215/55/R17 tires, modeled with the MTF 5.2 (Pacejka, 2002) formula. The simulation setting was prepared based on a: sine sweep test, double lane change maneuver and step steer input under different grip/friction conditions. The algorithm activation conditions were: tire force error>threshold error (approx. 10 N) and tire slip angle>2.5 degrees. The algorithm actuation command graph is seen in FIG. 6A with the actual (CarSim) vs. estimated (observer based) results in comparative form shown. The activation point is seen encircled in FIG. 6B. The slip angle estimator performance graphs of FIG. 6B show good agreement between the actual (CarSim), the estimated (based on an open-loop observer) and the estimated (based on vehicle sideslip angle estimates).

Figure 7A:
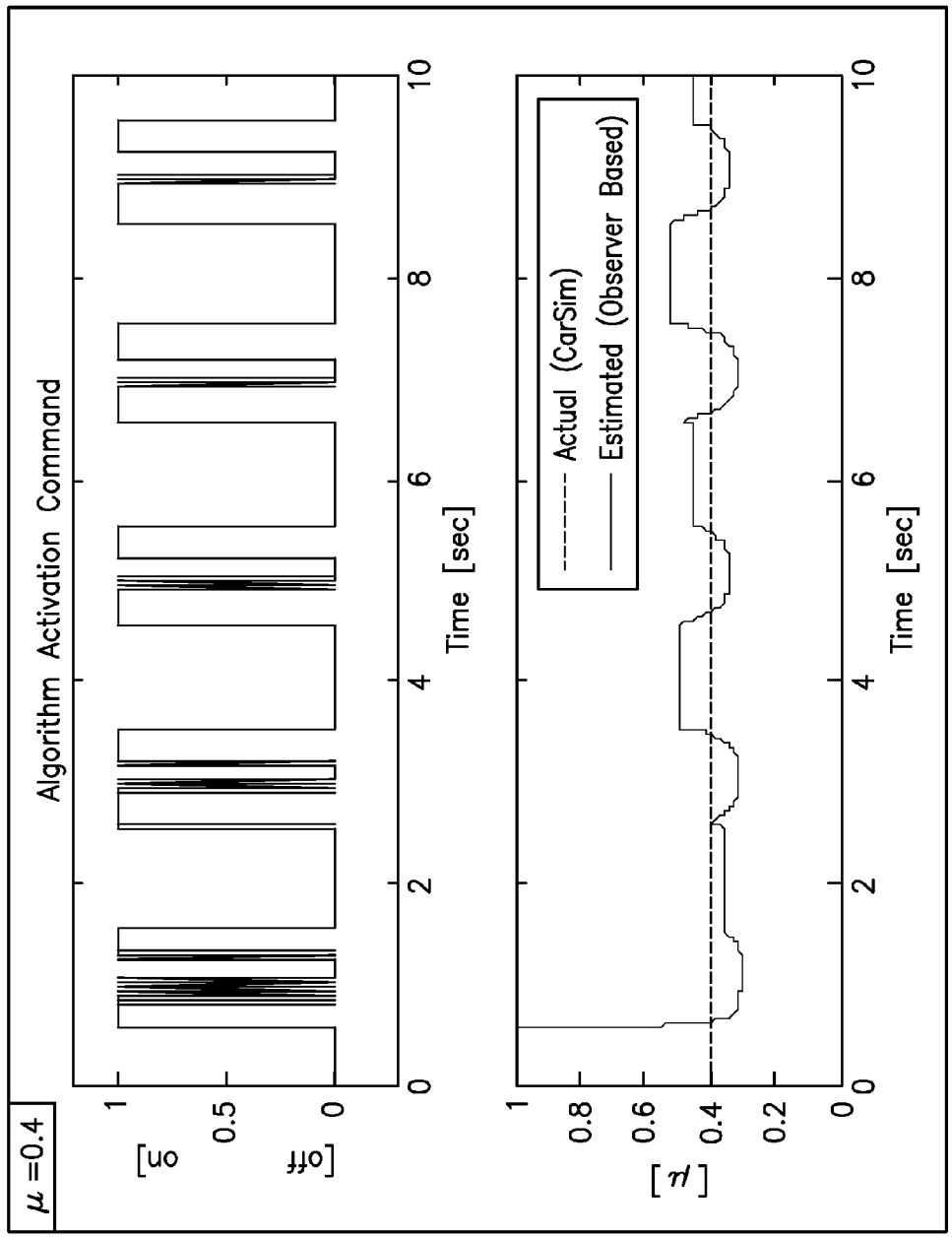
FIG. 7A is a graph of observer-based vs. actual (CarSim) for a friction coefficient of 0.4'
Figure 7B:
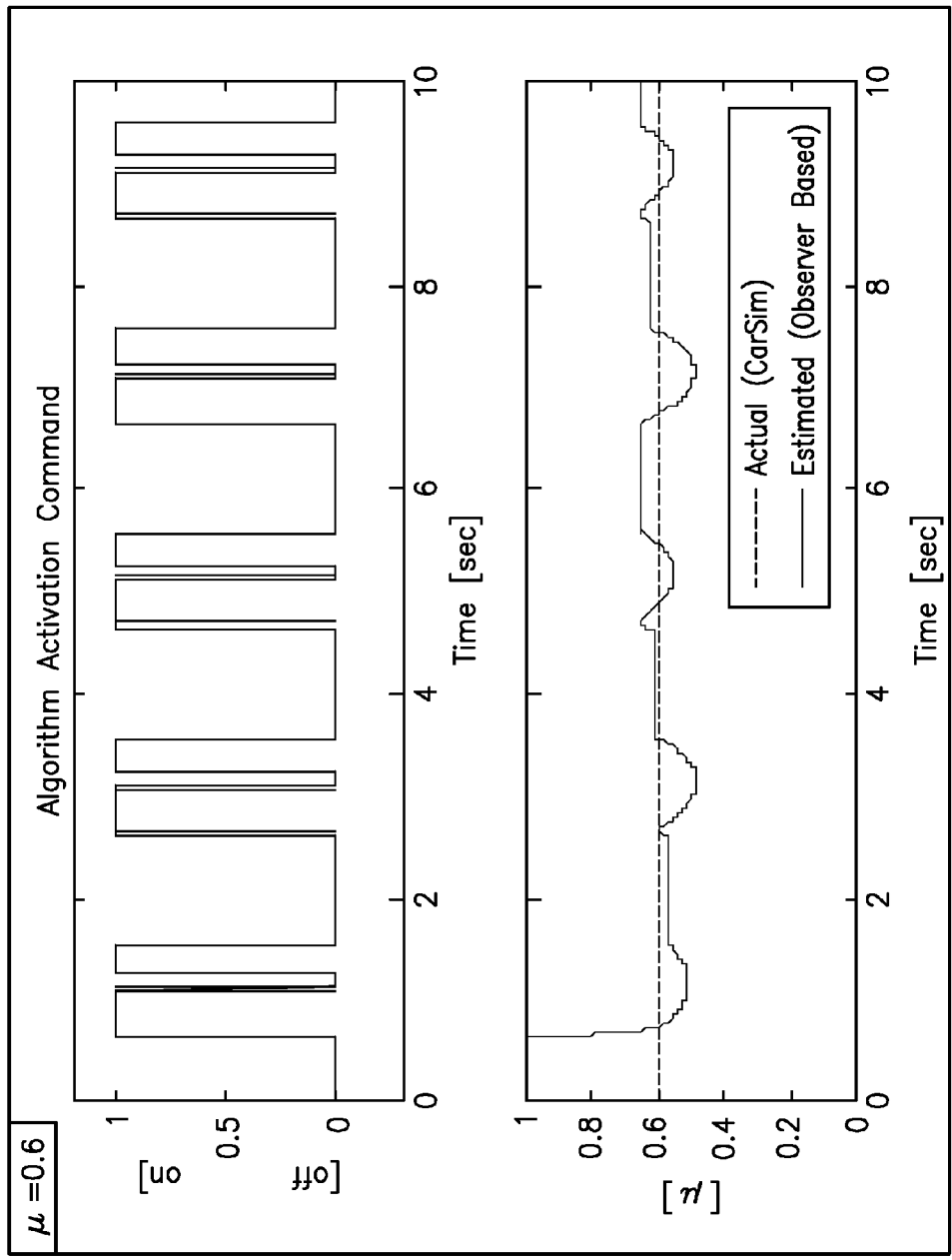
FIG. 7B is a graph of observer-based vs. actual (CarSim) for a friction coefficient of 0.6.
Figure 7C:
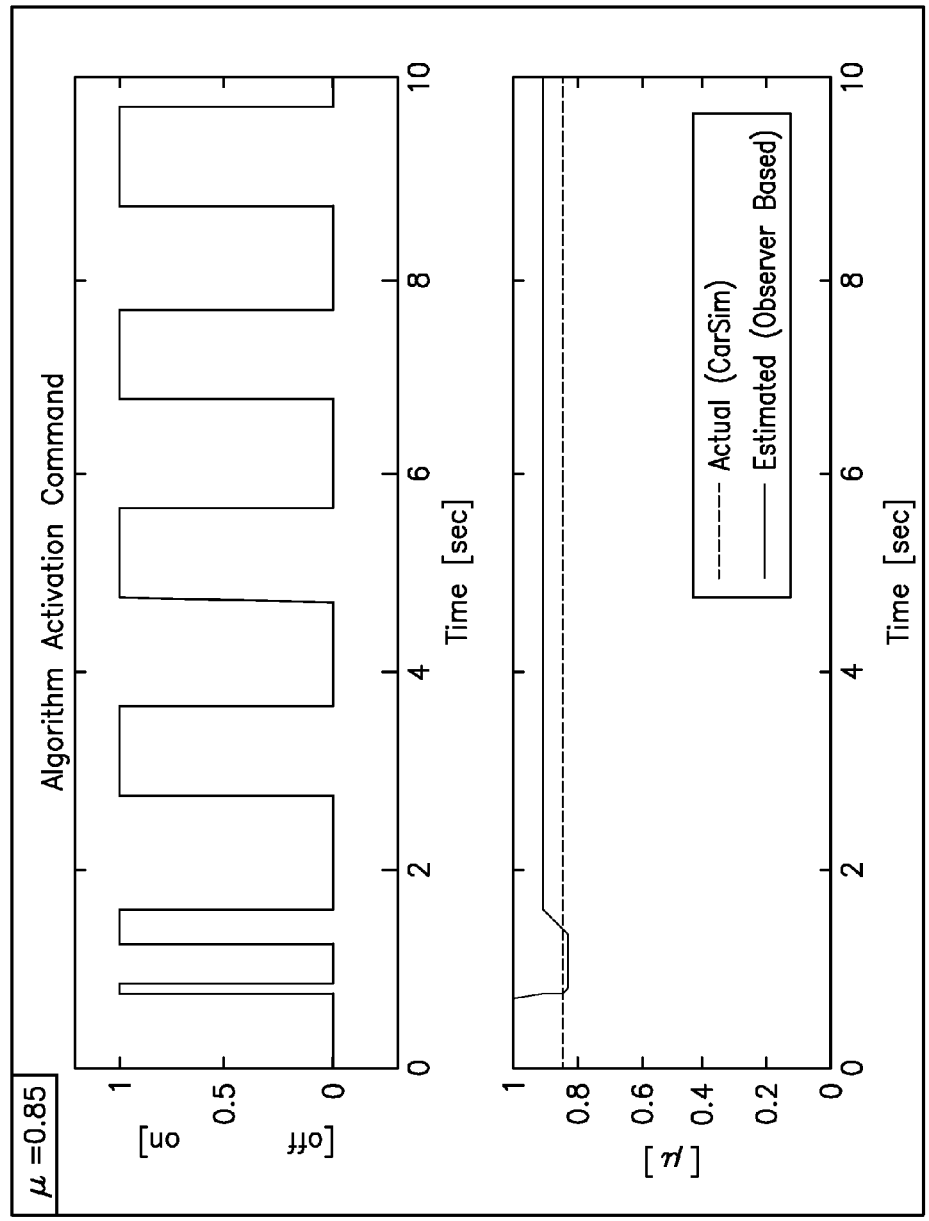
FIG. 7C is a graph of observer-based vs. actual (CarSim) for a friction coefficient of 0.85.

Simulation results are shown graphically in FIGS. 7A through 7C for a sine sweep test for respective different coefficients of friction μ=0.4, 0.6, and 0.85. The algorithm activation command graph is shown and the resultant friction estimation graph comparing actual (CarSim) vs. estimated (observer based) shown therebelow. The graphs are indicative of good predictive results using the observer to predict friction on various road conditions. The estimates converge to actual value in all the friction coefficient cases.

Figure 8A:
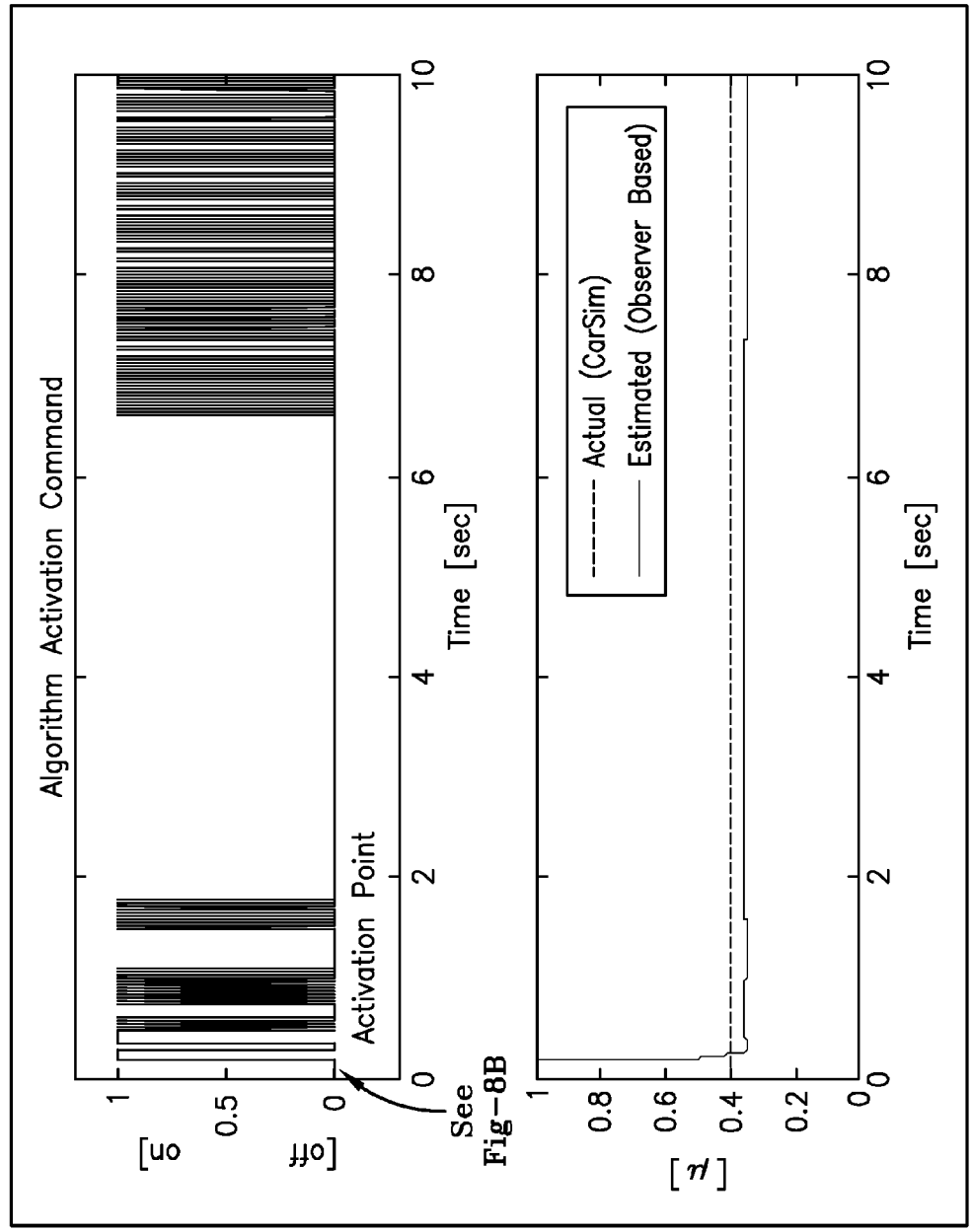
FIG. 8A is a graph of observer-based vs. actual (CarSim) for slip angle greater than 2.5 degrees.
Figure 8B:
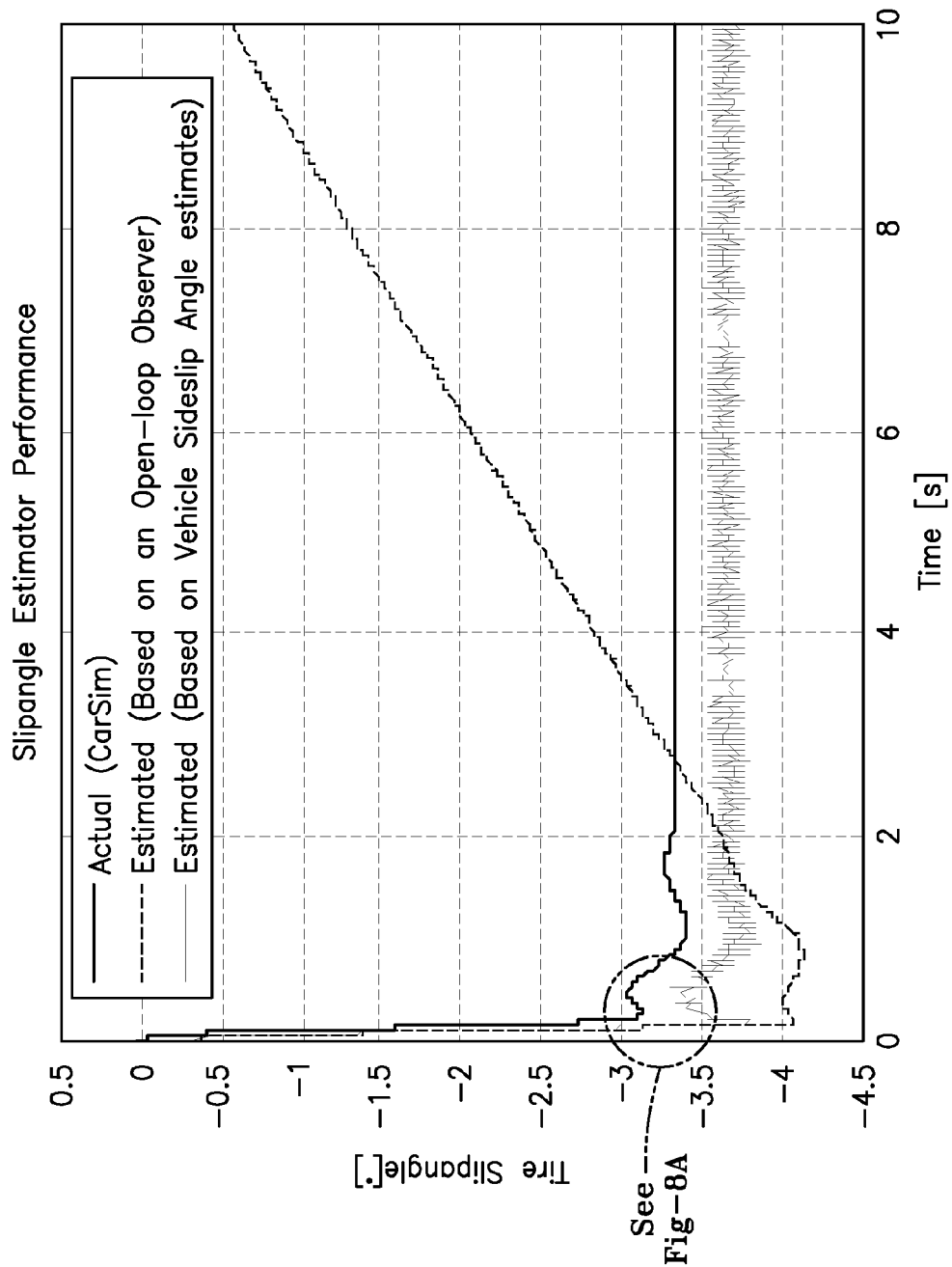
FIG. 8B is a graph showing slip angle estimator performance, comparing actual to estimated (based on an open-loop observer) and estimated (based on vehicle sideslip angle estimates).

FIGS. 8A and 8B illustrate slip angle estimator performance during a test in which step steer was at 80 degrees at 60 km/h. The algorithm activation conditions were:
Tire force error>threshold error (Approx. 10N)
Tire slip angle>2.5 degrees In FIG. 8A, the algorithm activation command is shown graphically at the top and the estimation of friction coefficient graph below, comparing actual (CarSim) against estimated (observer based). In FIG. 8B the slip angle estimator performance is shown comparing actual (CarSim) vs. estimated (based on an open-loop observer) vs. estimated (based on vehicle sideslip angle estimates). FIG. 8B shows graphically the slip angle estimator performance (36 in FIG. 2). Actual (CarSim), open-loop observer and vehicle estimate are compared.

Figure 9A:
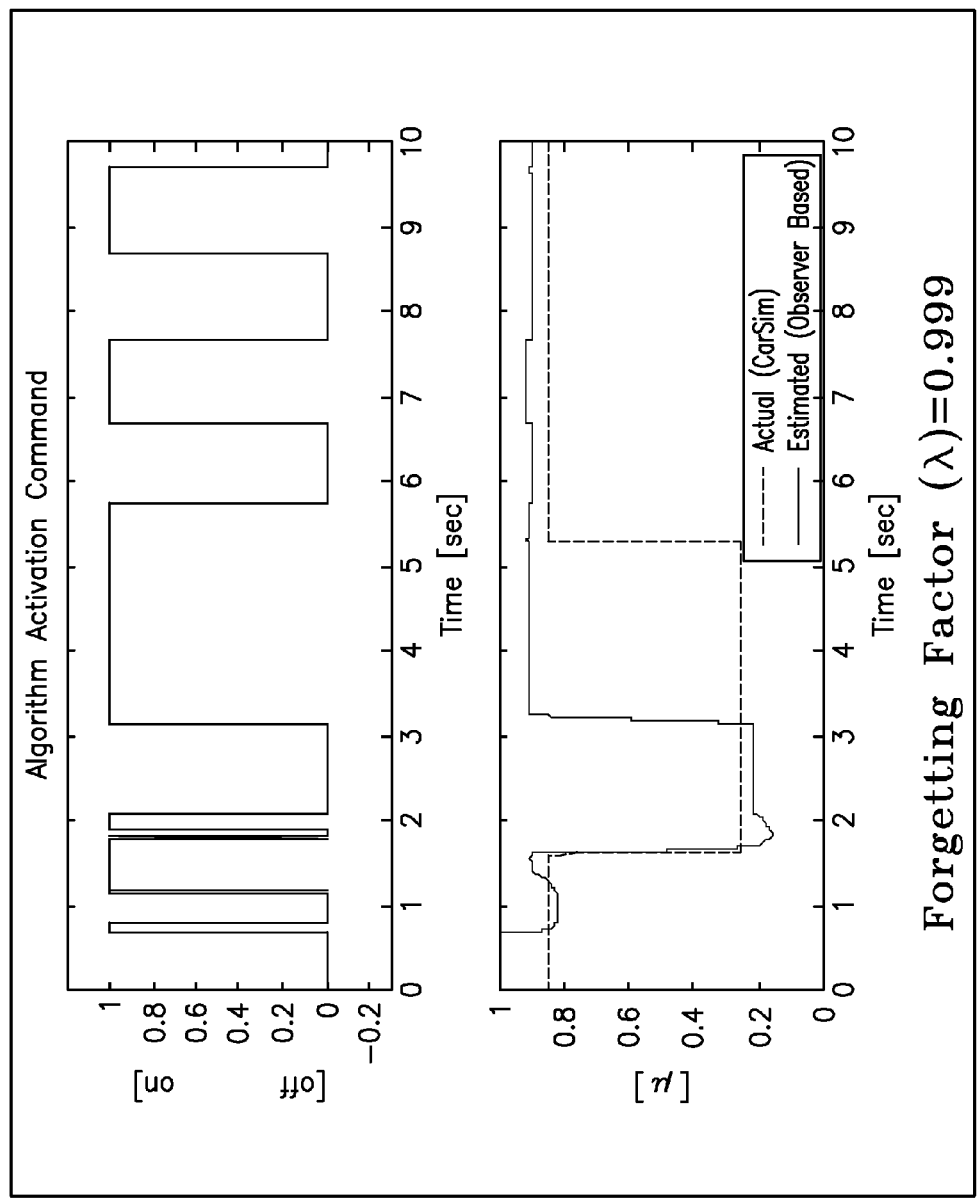
FIG. 9A is a graph showing the results of a time sweep test under "jump-Mu" conditions.
Figure 9B:
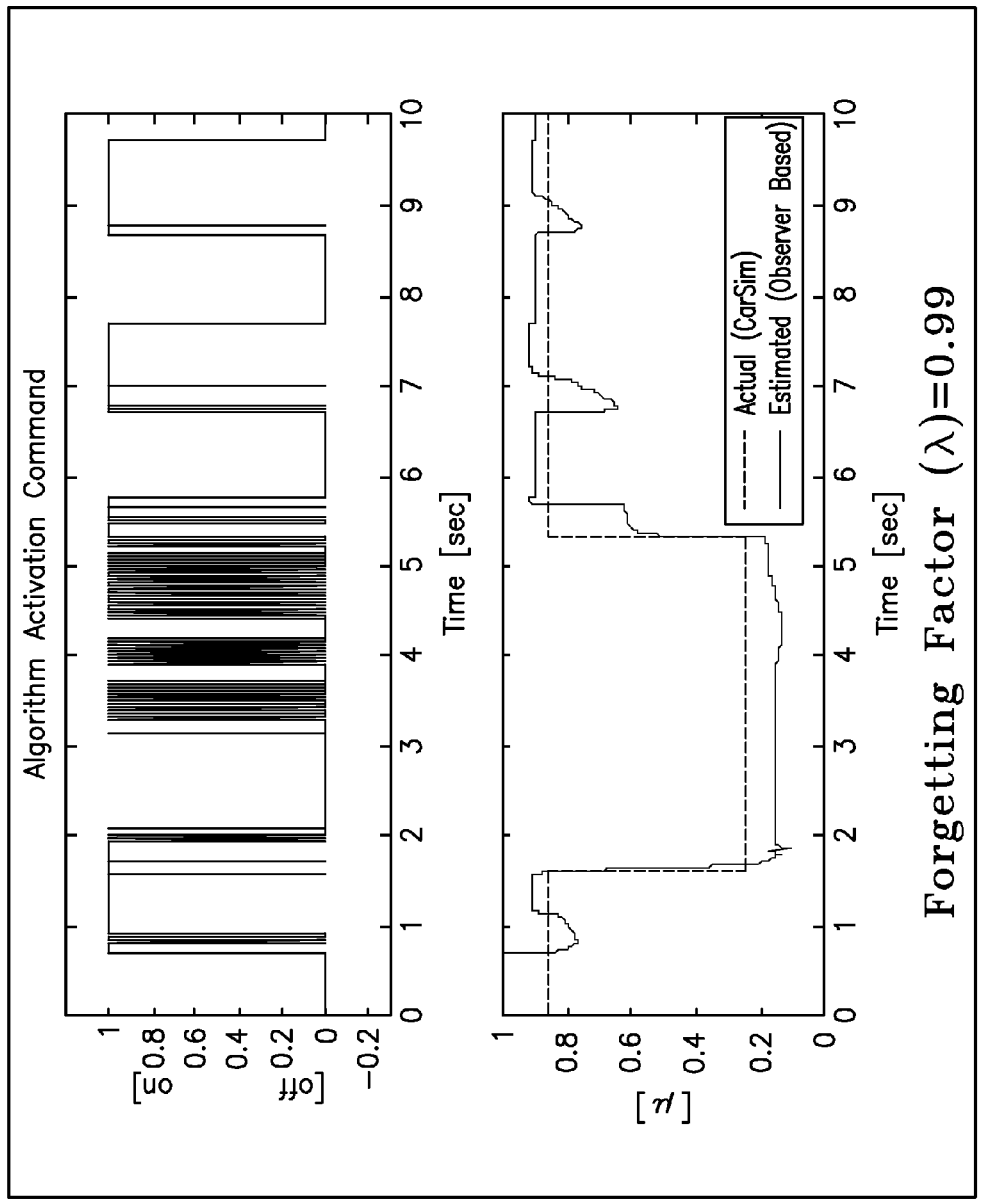
FIG. 9B is a graph showing actual vs. observer-based slip angle results using a forgetting factor $\lambda=0.99$.

FIG. 9A shows test results when a variable forgetting factor RLS algorithm is employed for estimation of road friction μ. A forgetting factor (λ) of 0.999 is employed. The algorithm activation command is shown in FIG. 9A with the friction estimation results comparing actual (CarSim) to estimated (observer based) below. The variable forgetting factor RLS algorithm yields better convergence. In FIG. 9B, results are shown for a sine sweep test in which jump μ conditions are simulated. The same forgetting factor, (λ)=0.99 was used. A sudden changes in road friction resulted in the road friction predicting graphs shown in FIG. 9B.

From the foregoing, it will be appreciated that a robust and accurate estimation of the maximum tire-road friction coefficient is achieved by the system and method disclosed. The system and method are based on an observer 46 (FIG. 2) that minimizes the error between the developed lateral force (estimated using a SMC observer) and the force estimated using a tire-road interaction model 32, based on a modified dugoff tire model. The tire model is adapted to information from intelligent tires (pressure, temp, load, tire wear state) as seen at 42, 44 in the calculation of tire cornering stiffness 40. The error between the value provided by the modified dugoff model (32 in FIG. 2) and the value of the estimated force from the vehicle observer 46 is evaluated, and is used as the stop criterion for the "friction update" loop. As long as the tires work in the nonlinear region as shown between the arrows 54, 56 of FIG. 10, the maximal friction coefficient may be estimated.

Figure 10:
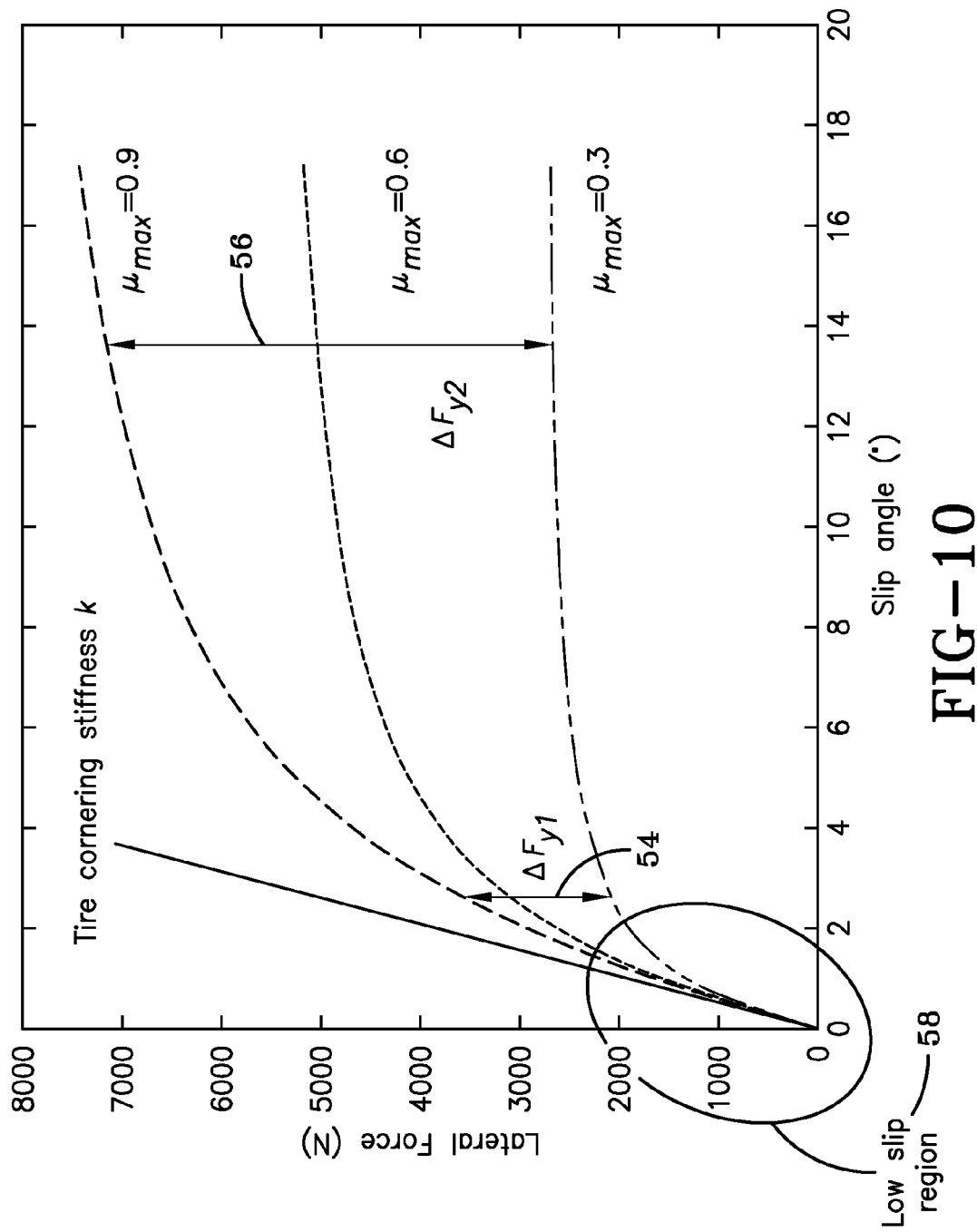
FIG. 10 is a graph of lateral force vs. slip angle for different Mu values.

In the linear range of operation, the subject algorithm is not able to estimate maximum friction coefficient correctly. This can be attributed to the fact that the tire force curve is independent of friction coefficient in this region. FIG. 10 shows the low slip (linear) portion 58 of the force curves for the three friction values.

The subject road friction estimation system and method thus is described above to include tire-affixed sensors 18 mounted to the tires of a vehicle and on-board vehicle sensors providing vehicle-based parameter information via CAN bus. A model-based tire force estimator 32 is operable generating from both tire and vehicle sensor-input a model-derived tire force estimation. A vehicle observer 46 generates an observer-derived tire force estimation from the axle force estimator 34 based upon vehicle sensor generated information. A friction estimator in the form of the error-reducing loop between the tire force estimator 32 and the observer 46 generates a road friction estimation by comparing the model-derived tire force estimation 32 to the observer-derived tire force estimation 46.

It will be appreciated that the vehicle observer 46 receives inputs based upon sensor-measured tire-specific information including a load estimation for the vehicle tire obtained from the dynamic tire load estimator 24, a slip angle estimation for the vehicle tire obtained from tire slip angle estimator 36 and a tire cornering stiffness input from the tire cornering stiffness adaptation to pressure, temperature, load and tire wear state 40. Accordingly, the model-based tire force estimator 32 employs and utilizes a slip-dependent friction function. The cornering stiffness adaptation inputs include dynamic tire loading estimation from the dynamic tire load estimator 24 derived from the vehicle-based sensors 22 as well as tire-based sensors used in the static tire load estimator 30.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A road friction estimation system for a road on which a vehicle is traversing, comprising:
the vehicle having at least one supportive vehicle tire, the vehicle tire having a tire cavity and a ground-engaging tread, and the tire having a plurality of tire-specific parameters;
a plurality of tire-affixed sensors mounted to the tire operably measuring the tire-specific parameters to generate tire-specific information;
a plurality of on-board vehicle sensors mounted to operably measure a plurality of vehicle-specific parameters to generate vehicle-specific information;
a model-based tire force estimator operable to generate a model-derived tire force estimation;
a vehicle observer operable to generate an observer-derived tire force estimation;

a friction estimator operable to generate a road friction estimation from a comparison of the model-derived tire force estimation and the observer-derived tire force estimation;

wherein the vehicle observer receives a plurality of inputs based upon the tire-specific information; and wherein the plurality of inputs to the vehicle observer comprises:

a load estimation for the one vehicle tire;

a slip angle estimation for the one vehicle tire;

a cornering stiffness estimation for the one tire.

2. The road friction estimation system of claim 1, wherein the cornering stiffness estimation for the one tire comprises cornering stiffness adaptation inputs based upon the tire-specific information.

3. The road friction estimation system of claim 2, wherein the cornering stiffness adaptation inputs comprise temperature change within the one tire, pressure change within the one tire, wear state of the one tire and loading on the one tire.

4. The road friction estimation system of claim 3, wherein the model-based tire force estimator operably utilizes a slip-dependent friction function.

5. The road friction estimation system of claim 3, wherein the cornering stiffness adaptation input providing the loading on the one tire is derived from a dynamic load estimator having as inputs the vehicle-specific information and the tire-specific information.

6. The road friction estimation system of claim 3, wherein the cornering stiffness adaptation inputs providing the changes in the temperature and the pressure of the one tire are derived from the plurality of tire-affixed sensors.

7. A road friction estimation system for estimating a friction coefficient for a road on which a vehicle is traversing, comprising:

the vehicle having at least one supportive vehicle tire, the vehicle tire having a tire cavity and a ground-engaging tread, and the tire having a plurality of tire-specific parameters;

a plurality of tire-affixed sensors mounted to the tire operably measuring the tire-specific parameters to generate tire-specific information;

a plurality of on-board vehicle sensors mounted to operably measure a plurality of vehicle-specific parameters to generate vehicle-specific information;

a model-based tire force estimator operable to generate a model-derived tire force estimation;

a vehicle observer operable to generate an observer-derived tire force estimation;

a friction estimator operable to generate a road friction estimation from a comparison of the model-derived tire force estimation and the observer-derived tire force estimation;

wherein the vehicle observer receives a plurality of inputs based upon the tire-specific information, the plurality of inputs to the vehicle observer are determined from the tire-affixed sensors and comprise: a load estimation for the one vehicle tire; a slip angle estimation for the one vehicle tire; a cornering stiffness estimation for the one tire.

8. The road friction estimation system of claim 7, wherein the cornering stiffness estimation for the one tire receives a plurality of stiffness adaptation inputs based upon the tire-specific information, the cornering stiffness adaptation inputs comprising:

temperature change within the one tire;

pressure change within the one tire;

wear state of the one tire; and loading on the one tire.

9. The road friction estimation system of claim 8, wherein the model-based tire force estimator operably utilizes a slip-dependent friction function.

10. A method for estimating road friction on which a vehicle is traversing, comprising:

equipping the vehicle with at least one supportive vehicle tire, the vehicle tire having a tire cavity and a ground-engaging tread, and the tire having a plurality of tire-specific parameters;

attaching a plurality of tire-affixed sensors to the tire operably measuring the tire-specific parameters to generate tire-specific information;

attaching a plurality of on-board vehicle sensors to the vehicle to operably measure a plurality of vehicle-specific parameters to generate vehicle-specific information;

generating from a model-based tire force estimator a model-derived tire force estimation;

generating from a vehicle observer an observer-derived tire force estimation;

generating from a friction estimator a road friction estimation from a comparison of the model-derived tire force estimation and the observer-derived tire force estimation; and wherein the plurality of inputs to the vehicle observer comprises:

a load estimation for the one vehicle tire;

a slip angle estimation for the one vehicle tire;

a cornering stiffness estimation for the one tire.

11. The method of claim 10, wherein further comprising inputting cornering stiffness adaptation inputs into the cornering stiffness estimation.

12. The method of claim 11, wherein the cornering stiffness adaptation inputs comprise temperature change within the one tire, pressure change within the one tire, wear state of the one tire and loading on the one tire.

13. The method of claim 12, wherein further comprising deriving the cornering stiffness adaptation input from a dynamic load estimator having as inputs the vehicle-specific information and the tire-specific information.

14. The method of claim 13, wherein further comprising determining the changes in the temperature and the pressure of the one tire from the plurality of tire-affixed sensors.

* * * * *